United States Patent [19]

Leterrier

[11] 3,898,620

[45] Aug. 5, 1975

[54] SYSTEM FOR TRANSFERRING BITS BETWEEN A PLURALITY OF ASYNCHRONOUS CHANNELS AND A SYNCHRONOUS CHANNEL

[75] Inventor: Jean Leterrier, Chatou, France

[73] Assignee: Compagnie Europeenne de Teletransmission - C. E. T. T., Paris, France

[22] Filed: Apr. 5, 1973

[21] Appl. No.: 348,052

[30] Foreign Application Priority Data

Apr. 11, 1972 France ............................ 72.12639

[52] U.S. Cl. ............................................ 340/172.5

[51] Int. Cl. ........................ G11c 9/00; G11c 21/00

[58] Field of Search ................................ 340/172.5

[56] References Cited

UNITED STATES PATENTS

| | | | |
|---|---|---|---|
| 3,417,378 | 12/1968 | Simonsen | 340/172.5 |
| 3,434,117 | 3/1969 | Gibson et al. | 340/172.5 |
| 3,510,843 | 5/1970 | Bennett et al. | 340/172.5 |
| 3,566,360 | 2/1971 | Stollman et al. | 340/172.5 |

*Primary Examiner*—Paul J. Henon
*Assistant Examiner*—Paul R. Woods
*Attorney, Agent, or Firm*—Cushman, Darby & Cushman

[57] ABSTRACT

An intermediate memory, which is a circulating one, is used for the transfer of the bits between K terminal one-bit memories coupled to the K asynchronous channels and a $(K+1)^{th}$ one-character memory coupled to the synchronous channel.

This circulating memory comprises sections, circulating in shift registers, each section including a data compartment and an auxiliary compartment for information concerning the amount of occupation of the corresponding data compartment. A group of successive sections is assigned to each one of the K terminal one-bit memories. Data bits are written in the circulating memory in the first section of the appropriate group not yet occupied by a complete character, upon this section occupying the first stages of the shift registers. The data bit extraction from the circulating memory occurs only from the first (in the direction of circulation of the sections) section of a group upon this section occupying the last stages of the registers. When an extraction results in making the data compartment of the first section of a group wholly available, the contents of each one of the other sections of this group are transferred to the preceding section.

7 Claims, 15 Drawing Figures

SYSTEM FOR TRANSFERRING BITS BETWEEN A PLURALITY OF ASYNCHRONOUS CHANNELS AND A SYNCHRONOUS CHANNEL

The present invention relates to a bit transfer system, between a plurality of asynchronous channels and a synchronous channel, for example telegraphy channels or data transmission channels operating in a binary transmission system.

Certain knonw devices of this kind comprise memory circuits which are reduced to a single trigger circuit per input channel and a single trigger circuit per output channel, for bit by bit multiplexing or demultiplexing. This imposes limitations upon the mixing of asynchronous channels having different transmission speeds or different numbers of bits per character.

It is equally well-known to employ a register holding one character per input channel and per output channel for character by character multiplexing or demultiplexing, and this results in an increase in the volume of the circuits coupled to the asynchronous channels.

Finally, yet other devices utilise a static memory having an adequate capacity, the operation of which is carried out by a series of automatic systems. The drawback here is the cost.

The object of the present invention is a bit transfer system avoiding this drawback.

According to the invention, there is provided a bit transfer system for transferring data bits between each one of a number of asynchronous channels, and a synchronous channel, the number of the asynchronous channels not exceeding a predetermined integer K greater than 1, and the number of data bits per data character not exceeding a predetermined integer $n$ greater than 1 for anyone of the asynchronous channels, said system comprising: K first storage circuits respectively including K first terminal memories, each of said K first storage circuits comprising means for coupling to an asynchronous channel, and each of said K first terminal memories having a one-bit capacity; a $(K+1)^{th}$ storage circuit having means for coupling to a synchronous channel, and including a $(K+1)^{th}$ terminal memory having an $n$-bit capacity; a circulating intermediate memory, comprising K.C data compartments, C being an integer greater than 1, each data compartment comprising $n$ cells, said intermediate memory further having auxiliary cells for storing bits indicating the amount of occupation of said data compartments, each of said cells having a one-bit storage capacity, said circulating intermediate memory comprising an assembly of shift registers having stages and means for applying thereto the same clock pulses, said assembly of shift registers comprising $n$ data shift registers for the circulation of said data compartments; an address circuit coupled for receiving said clock pulses, for determining in said intermediate memory K groups of C successive data compartments and assigning said K groups respectively to said K first terminal memories; and a control device, coupled to said intermediate memory and to said address circuit, for controlling the bit by bit transfer of bits between each one of said K first terminals memories and the group of data compartments assigned therto, and the character by character transfer of bits between each of said K groups of data compartments and said $(K+1)^{th}$ terminal memory, said control device comprising first means for causing the input bit transfers into each of said K groups of data compartments on the one hand into the first one, in the direction of circulation of said data compartments, of the compartment of the considered group not yet occupied by a whole character and on the other hand into the first stages of said data shift registers, means for causing the output bit transfers from a group of data compartments on the one hand from the first compartment of said group and on the other hand from the last stages of said data shift registers, and further means for, when such an output transfer makes wholly available the first data compartment of a group of data compartments, causing the transfer of the contents of each of the other data compartment of this group to the preceding data compartment.

It will be observed that it has been proposed to use, in computers, a circulating memory between one-bit terminal memories of peripheral elements and a one-character memory of a central processor. However, in such systems, the problem was not encountered of having to cope with the rythm of an asynchronous channel, which problem is solved, in the bit transfer system according to the invention, in particular by means of the bit transfers between data compartments superimposed on the general circulating motion of the intermediate memory.

The present invention will be better understood and others of its features rendered apparent, from a consideration of the ensuing description and the related drawings in which:

FIG. 1 schematically illustrates the circulating memory utilised in a bit transfer system according to the invention;

Figure 13:
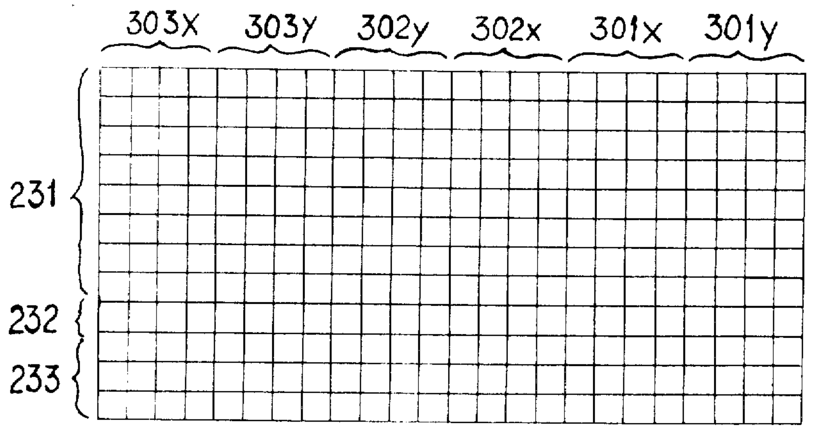

FIG. 13 schematically illustrates a circulating memory which can be utilised in a bit transfer system in accordance with the invention, for simultaneous multiplexing and demultiplexing.

Figure 3:
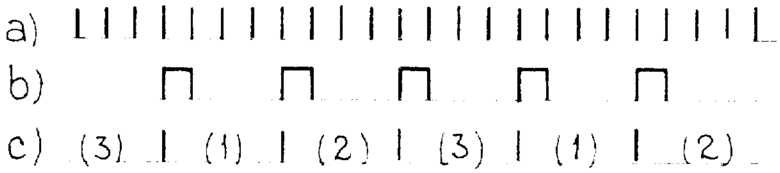
FIG. 3 is a time-diagram.
Figure 14:
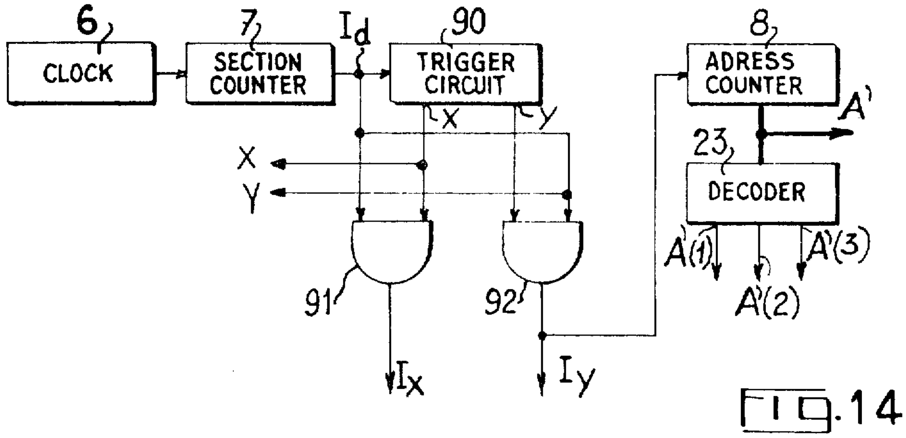
Figure 15:
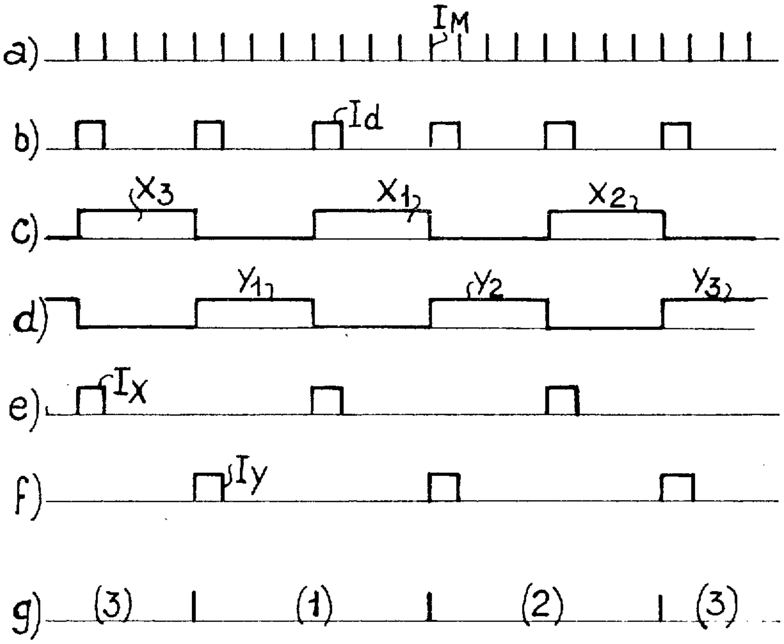

FIG. 14 is the diagram of an address circuit which can be used with the memory of FIG. 3;

FIG. 15 is a time-diagram.

There will first be considered the multiplexing, in a syncrhonous channel of adequate transmission speed $F_s = 1/T_s$, where $T_s$ is the duration of a data bit, of the information coming from K asynchronous channels $k$ ($k = 1,2, \ldots K$), the number of data bits in a character of the channel $k$ being $N_k$ and the transmission time of a data bit in the channel $k$ being $T_k = 1/F_k$.

To simplify matters it will be assumed that $k = 3$ (it being understood that this number will normally be very much higher, 30 for example).

Figure 1:
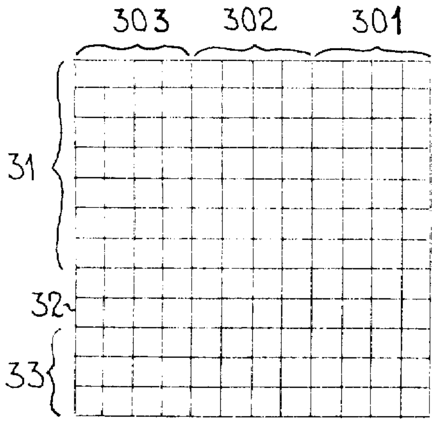

In the multiplexer, a circulating memory (FIG. 1) will be used, comprising a number of groups of sections, at least equal to K and which in the present instance will be assumed equal to K, each group with C sections, C being the maximum number of characters to be stored per asynchronous channel, in accordance with the transmission conditions. It will be assumed that C = 4

ıch section comprises Q cells circulating synchro-›usly, with $Q = n + 1 + p$, where $n$ is the maximum ›ssible value of the numbers $N_k$ and where $p$ is the ımber of bits required to unambiguously express the ›sition number of a data bit in a character comprising data bits. It will be assumed that $n = 8$, whence $p =$ (it being understood that the binary number 000 will ;nify 1 and that the binary number 111 will signify 8 decimal notation) and that $Q = 12$.

The three groups of sections, respectively assigned to e three asynchronous channels, are designated in G. 1 by 301, 302 and 303.

The circulating memory will be made up of $Q = 12$ ift registers each with K.C. = 12 stages, to which the me shift pulses are applied, the assembly of stages of e same position number in the various registers, cor-sponding at a given instant to a section of the circu-ting memory.

The circulating memory is subdivided into a data emory 31 utilising the first $n$ registers, an occupation emory utilising the $9^{th}$ register, and a position number emory 33 utilising the last three registers.

Each section is then divided up into a data compart-ent made up of $n = 8$ cells, an occupation cell and a ›sition number compartment with $p = 3$ cells.

Each data compartment of a group is designed to re-:ive a character from the asynchronous channel to hich this group is assigned.

The occupation cell of a memory section will contain ıe bit 1 if a character recorded in the data compart-ent is complete and the bit 0 if the contrary is the ıse.

Finally, the three calls of a position number compart-ıent receive three bits expressing the binary number representing the position number of the first data cell ill unoccupied, in the data compartment of the sec-on to which this position number compartment be-›ngs.

The utilisation of the circulating memory is based pon the following principle:

The bits in the different asynchronous channels are ımpled one by one in input storage circuits and re-›rded one by one in the data memory, the successive its of one and the same character being recorded in ıe successive cells of a data compartment belonging to section assigned to the channel from which the char-:ter stems, the data compartments being utilised suc-:ssively in the order of the corresponding sections, nd the oldest character thus being recorded in the first :ction of the group. Recording is carried out in the rst stages of the registers.

When a character has been completely recorded in ıe first section of a group of the memory, all the bits f this character are simultaneously transferred (when ıid section occupies the last stages of the register) to n output storage circuit which directs it bit by bit to ıat time channel of the synchronous multiplex channel ·hich is assigned to the asynchronous channel from ·hich said character comes. The contents of the other :ctions of the group of sections in question, are then ıifted one section forward in this same group.

Before describing the circuits, the following conven-ons ought to be made clear:

Several inputs, wires and outputs, in parallel, will ›metimes be represented by a single input, connection r output, drawn however with a thicker line than those used to indicate actual single inputs, connections, or outputs.

On the other hand, an output of a circuit supplying a signal for which a symbol, P for example, is used, will be designated by said same letter P, and the same applies to the input of a circuit receiving this signal.

It will be assumed furthermore that all the signals have two levels, 0 and 1, the binary signal having the level 0 or the level 1 in accordance with its value and an auxiliary signal having the level 1.

Finally, the circuits described in the example, incorporate numerous trigger circuits which are all of the bistable type. To abbreviate the description, the term first type trigger circuits will be applied to those which have two signal inputs, namely 1 and 0 inputs, which are used for triggering them into their respective 1 and 0 states. The term second type trigger circuits will be used to designate those which comprise a signal input and a control input which, when supplied with a pulse, makes it possible to record the signal 1 or 0 present at the signal input of the trigger circuit.

Figure 2:
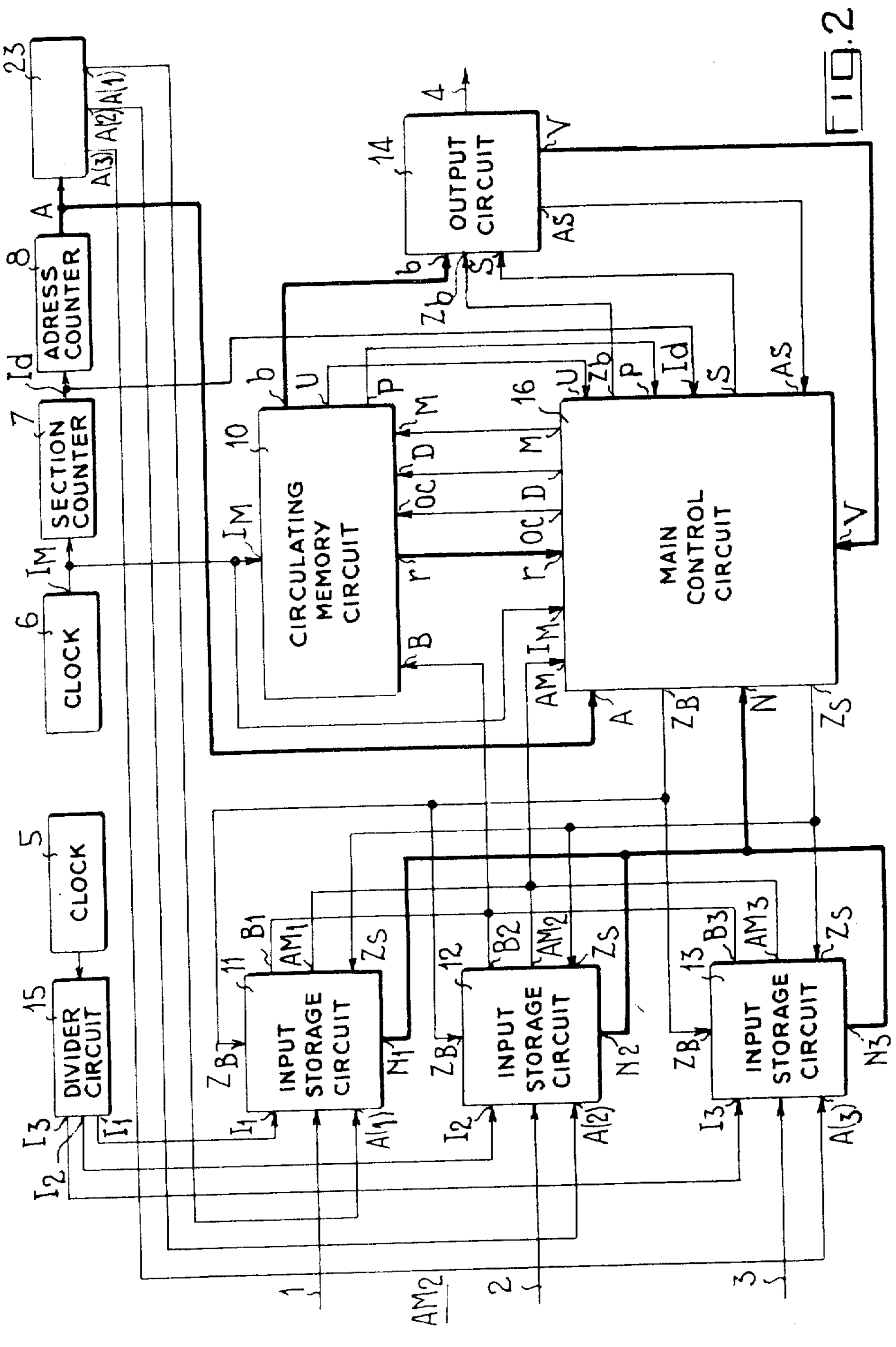
FIG. 2 is a block-diagram of a bit transfer system in accordance with the invention, for multiplexing purposes.

This being so, in FIG. 2, the general diagram of a multiplexing circuit in accordance with the invention has been illustrated.

Three input storage circuits 11, 12 and 13 respectively receive the signals from three asynchronous lines 1, 2 and 3.

A clock 5 produces pulses at the frequency $mF_c$ where $F_c$ is the lowest common multiple of the frequencies $F_k$ and m an even number in the order of 16 for example. The clock 5 is followed by a divider circuit 15 respectively supplying at 3 outputs respectively connected to the inputs $I_1$, $I_2$, $I_3$ of the input circuits 11, 12, 13, pulses $I_1$, $I_2$, $I_3$ at the frequencies $mF_1$, $mF_2$ and $mF_3$ respectively.

A clock 6 which supplies clock pulses $I_M$ at frequency $F_M$ to the registers of the circulating memory, on the other hand has its output connected to a section counter 7 which is a modulo $C = 4$ counter (number of sections in each group of the circulating memory) supplying an output pulse $I_d$ of duration $T_M$ when its count is 0. The section counter 7 is followed by an address counter 8 which is a modulo K = 3 counter (states 1, 2, 3) and is triggered by the leading edges of the output pulses from the counter 7. At its double output it supplies the two binary digits which express its state A.

FIG. 3 shows at (a), the pulses $I_M$ from the clock 6, at (b), the output pulses $I_d$ from the section counter 7, and at (c), in the form of strokes, the changes in state of the address counter 8, the successive states being indicated in parenthesis.

The pulses $I_d$ determine the groups of sections, respectively assigned to the K asynchronous channels, i.e. to the K input circuits, in that the memory section occupying the last stages of the registers for the duration of the pulses $I_d$ supplied by the address counter while the latter is in the $k$ state is the last section of the group of sections preceding (in the direction of circulation of the sections) that which is assinged to the channel K. The pulses $I_d$ will be referred to as "last section" pulses.

The double output A of the address counter 8 is connected to the double input A of a decoder 23 whose outputs A(1), A(2) and A(3), associated with the 1, 2 and 3 states of the counter, are respectively connected to corresponding inputs of the input circuits 11, 12 and 13.

The diagram of FIG. 2 further comprises a circuit 10 embodying the circulating memory proper and auxiliary control circuits, a main control circuit 16 and an output storage circuit 14 supplying the synchronous line 4. The circuits 10 and 16 receive at their inputs $I_M$ the clock pulses 6 and the circuit 16 receives the signal A and the pulses $I_d$.

The other interconnections between the elements of the diagram shown in FIG. 2, will be described in the course of the more detailed description which is to be made of the input circuits, the memory circuit and the control circuit.

Figure 4:
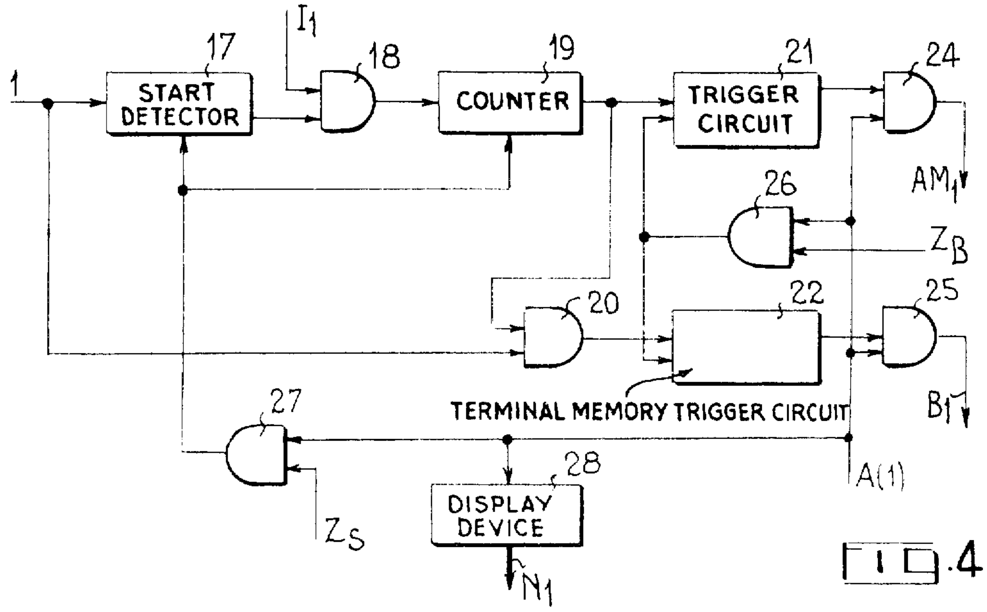
FIGS. 4 to 7 are detailed diagram of parts of the system of FIG. 2.

FIG. 4 is the detailed diagram of an input storage circuit which we will assume here to be the input circuit 11, the others differing from this only in terms of the characteristics $F_k$ and $N_k$ of the channels supplying them and of the numbers 1, 2 and 3 arbitrarily assigned to the asynchronous channels.

The input A(1) of the circuit supplies it with an enabling signal for the 1 state of the address counter 8 (this will be the input A(2) in the case of the input circuit 12 and the input A(3) in the case of the input circuit 13). The presence of an output signal from the input circuit or the utilisation therein of a signal from the main control circuit, is subordinate to the presence of this enabling signal so that the three input circuits operate during different time intervals in those respects.

In FIG. 4, there can be seen on the other hand the line or channel 1 which in the first place supplies a start detector 17 whose output is connected to the second input of an AND-gate 18, the first input of which, which is the input $I_1$ of the input circuit, is supplied with the pulses $I_1$ of frequency $mF_1$. The output of the gate 18 is connected to the input of modulo *m* counter 19 operating as a divider by a factor of *m* and supplying an output pulse each time it changes to the state *m*/2.

The line 1 and the output of the counter 19 are connected to the two inputs of an AND-gate 20.

The output of the counter 19 and that of the gate 20 are respectively connected to the 1 inputs of two first type trigger circuits 21 and 22. Two AND-gates 24 and 25 have their first inputs respectively connected to the outputs of the trigger circuits 21 and 22 and their second inputs connected to the input A(1) of the input circuit. The output signals from the AND-gates 24 and 25 are marked $AM_1$ and $B_1$. Two other AND-gates 26 and 27 have their first inputs respectively connected to two inputs of the circuit respectively supplied by the control circuit 16, with two signals $Z_B$ and $Z_S$, and their second inputs connected to the input A(1) of the input circuit. The output of the gate 26 is connected to the 0 inputs of the trigger circuits 21 and 22 and that of the gate 27 to a reset input of the start detector 17 as well as to a zeroing input of the counter 19. The input storage circuit 11, finally, comprises a device 28 which may be set to display in the form of a binary number, the number $N_1$ of bits in a character in the channel 1 in question (the same conventions being utilised as for the position number signal), this display device having a control input connected to the input A(1) of the input circuit so that the signal $N_1$ is only produced if the decoder 23 is in the 1 state corresponding to the line 1, producing instead a zero signal in other cases.

The input storage circuit 1 operates in the following manner: when the line 1 starts to transmit, the start detector 17 enables the transfer of the pulses supplied by the input $I_1$ to the gate 18. These pulses have a recurrence periodicity of $T_1/m$, where $T_1$ is the duration of a data bit on the line 1. At the end of *m*/2 clock pulses, i.e. at the end of a time $T_1/2$, the modulo *m* counter 19 supplies a pulse which produces the sampling of a data bit on the line 1, by the gate 20. The trigger circuit 22, initially in the 0 state, changes to the 1 state if a 1 bit appears and remains in the 0 state if the contrary is the case. The first output pulse from the counter 19, on the other hand, places the trigger circuit 21 in the 1 state and this results in "write-in call" signal $AM_1$, appearing at the output of the gate 24, immediately if the enabling signal A(1) is present, or as soon as this latter signal appears. From the same instant onwards, the data bit stored in the trigger circuit 22 forms the signal $B_1$ at the output $B_1$ of the input circuit 11.

The frequency $F_M$ of shift in the circulating memory is chosen so that the memory performs at least two revolutions during each time interval $T_k$ ($k$ = 1, 2, 3).

Before the next output pulse from the modulo *m* counter 19 of the input storage 11, and by a process which will be described later on, the bit $B_1$ will have been recorded in the appropriate cell of the data memory, and the trigger circuit 21 reset to the 0 state, together with the trigger circuit 22 if the latter had previously been triggered to the 1 state, by a means of a pulse delivered by the gate 26 due to signal $Z_B$ and signal A(1) being simultaneously present at the inputs of this gate.

The sampling of the next data bit will be triggered by the second output pulse from the counter 19 and the process will start all over again until all the data bits of the character have been recorded in the circulating memory, the output $N_1$ being used to determine when this happens.

The start detector will then be reset to its initial state and the counter 19 reset to zero, by the simultaneous appearance of the signal $Z_S$ and the enabling signal for this input circuit.

The number *m* is chosen sufficiently large to enable accurate sampling to take place at the centre part of the bits.

Returning to FIG. 2, in addition to the inputs mentioned during the description of this drawing, there can be seen the inputs $Z_B$ and $Z_S$ referred to during the description of FIG. 4, the other input circuits likewise comprising inputs $Z_B$ and $Z_S$; all the inputs $Z_B$ are connected to one and the same output $Z_B$ of the main control circuit 16 and all the inputs $Z_S$ to one and the same output $Z_S$ of the main control circuit 16.

Also in FIG. 2, the outputs $AM_1$, $B_1$ and $N_1$ of the input storage circuit 11 can be seen, to which there correspond the outputs $AM_2$, $B_2$ and $N_2$ of the input storage circuit 12 and the outputs $AM_3$, $B_3$ and $N_3$ of the input storage circuit 13.

Since the input circuits are prevented from operating simultaneously, the outputs $AM_1$, $AM_2$ and $AM_3$ are connected to one and the same wire which transmits the signal AM which is the sum of the signals $AM_1$, $AM_2$ and $AM_3$, this wire terminating at the input AM of the control circuit 16. Similarly, the outputs $B_1$, $B_2$ and $B_3$ are connected to one and the same wire carrying the sum signal B and terminating at the input B of the circulating memory circuit 10, and the multple outputs $N_1$, $N_2$ and $N_3$ are connected to one and the same multiple connection carrying the composite signal N and te inating at the multiple input N of the main control rcuit 16.

Figure 5:
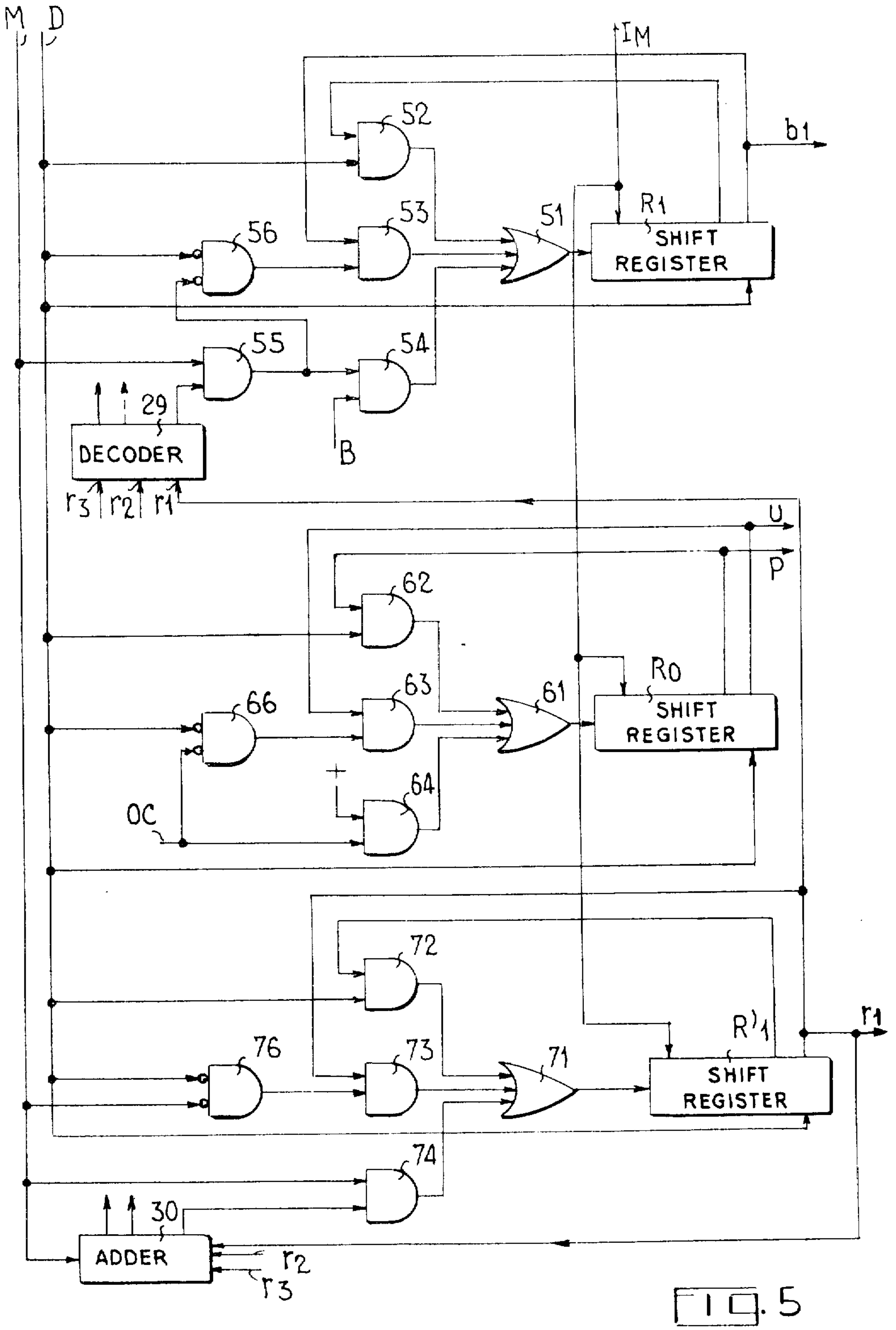

In FIG. 5 which represents the criculating memory ıd its input circuits, only the first, $R_1$, of the eight regters $R_1$ to $R_8$ of the data memory, the occupation regter $R_0$ and the first, $R'_1$, of the three registers $R'_1$ to $'_3$ of the position number memory, have actually been ıown of the overall memory, this because the input rcuits, referred to as the memory switching circuits, 'e nearly identical in the case of the eight registers $R_1$ ı $R_8$ and likewise in the case of the three registers $R'_1$ ı $R'_3$, while any difference will be specified later on. ll the registers receive the shift pulses $I_M$.

Each switching circuit comprises a "section contents ansfer gate," which is an AND-gate used for transferng the contents of each of the last three section of a ,emory group to the preceding section of this same oup, upon a character having being completely trans:rred from the first section of this group, these gates eing the gates 52, 62 and 72 in the case of the registers $_1$, $R_0$ and $R'_1$. Each switching circuit further comrises a "write-in" gate (AND-gates 54, 64, 74 respecvely for the three registers $R_1$, $R_0$ and $R'_1$) and a "loop .ND-gate" (53, 63, 73 respectively in the case of the ıree registers $R_1$, $R_0$ and $R'_1$); the outputs of those ıree gates, only one of which supplies a signal on the ppearance of a pulse from the circulating memory lock 6, are connected to the three inputs of an ORate (51, 61 and 71 respectively for the registers $R_1$, $R_0$ nd $R'_1$).

The first input of the section contents transfer gate of register switching circuit is connected to an external utput of the penultimate stage of the considered regis:r and the second inputs of all such gates are supplied 'ith one and the same "section contents transfer sigal" D, which is applied to the input D of the memory ircuit 10 by the main control circuit 16; the signal D ; also applied to the last stages of the various registers, s trailing edge being utilised to reset these stages to ero. All the registers operate in the same way during section contents transfer operation.

The write-in gate 54 of the register $R_1$ is a two-input ıND-gate supplied at its first input with the signal B :om the input storage circuits, which signal is applied ɔ the input B of the memory circuit, and is formed by succession of data bits. The gate 54 is supplied at its econd input with the output signal from an AND-gate 5. This latter receives at its first input a "write-in" sigal M applied to the input M of the memory circuit by ıe main control circuit 16. Its second input is conected to the first output of a decoder 29 common to he input switching circuits of the eight data registers. 'his decoder, at its three inputs, receives the output ignals $r_1$, $r_2$ and $r_3$ from the last stages of the three posiion number registers expressing the position number $r$ f the first empty cell in the data compartment of the ıemory section occupying the last stages of the regis:rs at the instant under consideration. It has eight out'uts corresponding respectively to the position num'ers 1 to 8 and the first of which is connected to the econd input of the gate 55. The write-in gate of each f the other data registers is supplied in the same way s the gate 54 except that the gate preceding the latter corresponding to the gate 55 in the case of the register $_1$) has its second input connected to the $q^{th}$ output of he decoder 29 for the register $R_q$($q = 2, 3 \ldots 8$).

The write-in gate 64 of the register $R_0$ has its first input connected to a positive voltage source supplying the level corresponding to a 1 bit, while its second input receives a signal OC applied to the memory circuit 10 by the control circuit 16 when the write-in which is to be carried out upon the appearance of the next clock pulse $I_M$ to come, will have the effect of completing the character recorded in the section which will then occupy the first stages of the registers.

This gate 64 could be discarded and the signal OC applied directly to the OR-gate 61. It is utilised here in order to render the circuits more symmetrical and facilitate explanation.

The switching circuits of the position number registers have a common adder 30 with a triple input the terminals of which are respectively connected to the outputs of the last stages of the position number registers, and a second input supplied with the write-in signal M, this signal M increasing by one unit, in the adder 30, the position number recorded in the section occupying the last stages of the registers, when a data bit is to be written in at the time of the next shift on the part of the registers. The three terminals of the multiple output of this adder are respectively connected to the first inputs of the write-in gates belonging to the switching circuits of the position number registers (gate 74 in the case of the register $R'_1$), the second inputs of these gates being supplied with the write-in signal M.

When no writing-in and no section contents transfer are to be carried out in the circulating memory, all the registers operate in the normal loop state. On the other hand, at the time of write-in, all the data registers except that into which a bit is to be written, also continue to operate in the normal loop condition. The same applies to the occupation register if the write-in does not complete a character.

The loop gate 53 of the register $R_1$ to this end has its first input connected to the output stage of the register while its second input is connected to the output of a NOR-gate 56 supplied at its first input with the section contents tansfer signal D and at its second input the output signal from the gate 55.

The loop gates of the other data registers are connected in the same way.

The loop gate 63 of the occupation register $R_0$ is supplied at its first input with the output signal from the last stage of the register and at its second input with the output signal from a NOR-gate 66 receiving the signal D and the signal OC.

The loop gate of each of the switching circuits of the position number registers (gate 73 in the case of the registers $R'_1$) is supplied at its first input with the output signal from the register and at its second input with that from a NOR-gate 76 common to all the switching circuits of the position number registers and supplied at its respective two inputs with the signals D (section contents transfer signal) and the signal M (write-in signal).

The memory circuit 10 has eight data outputs $b_1$ to $b_8$ which are the outputs of the eight data registers (only one, $b_1$, has been shown in FIG. 5), these outputs being connected to the output storing circuit 14 and being represented by a single multiple output $b$ in FIG. 2, connected to the multiple input $b$ of the output circuit 14.

The memory circuit 10 also comprises two auxiliary outputs which are those of the last two stages of the occupation register, namely U (output of the last stage) and P (output of the penultimate stage), these outputs being connected to two corresponding inputs of the main control circuit 16.

Finally, it comprises three outputs, $r_1$, $r_2$ and $r_3$ which are those of the last stages of the three position number registers $R'_1$ to $R'_3$ and which supply the position number signal $r$. Only the output $r_1$ has been shown in the drawing. In FIG. 2, these three outputs are combined into a single output $r$ terminating at the triple output $r$ of the control circuit 16.

Figure 6:
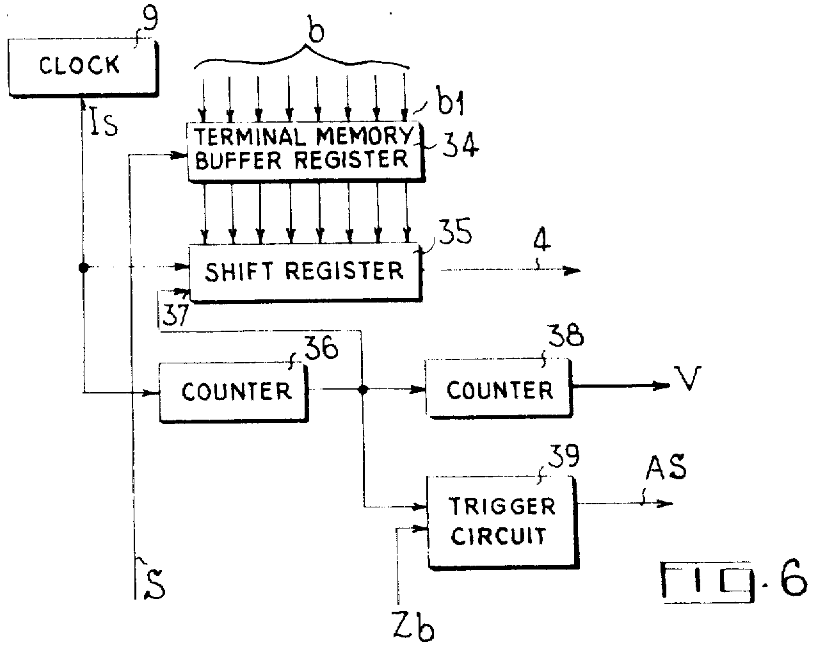

FIG. 6 is the diagram of the output storage circuit 14. The $n = 8$ wires of the multiple input $b$ are respectively connected to the inputs of the $n$ stages of a buffer register 34, the output $b_1$ of the memory circuit being connected to the input of the last stage of the buffer register.

The transfer to the stages of the buffer register 34, of the bits appearing at the multiple input $b$ is subordinate to the presence of an "extraction signal" S supplied to the output circuit 14 by the control circuit 16.

A clock 9 supplies pulses $I_s$ of frequency $F_s = 1/T_s$ where $T_s$ is the duration of a bit on the synchronous channel. The outputs of the $n$ stages of the buffer register 34 are respectively connected to the inputs of the $n$ stages of a shift register 35 supplied on the other hand with the clock pulses $I_s$, the output of the last stage of the register 35 supplying the synchronous line 4.

The pulses $I_s$ are also applied to a bit counter 36, which is a modulo $n$ counter operating as a divider by $n$, whose output is connected to a control input 37 of the register 35, making the parallel transfer to the register 35 of the data contained in the buffer register 34, conditional upon the presence of an output pulse from the counter 36.

The output pulses from the counter 36 are likewise applied to the input of a character counter 38 which is a modulo $K + 1 = 4$ counter identifying, by states 1, 2 and 3, the three time channels of the synchronous multiplex channel, the durations of which time channels, in this example, are the same in respect of all the asynchronous lines. The utilisation of the 0 state of this counter will be indicated later on.

The double output V of the counter 38 constitutes a double output V of the output storage circuit, supplying the time channel identification signal and connected to a double input of the control circuit 16.

The output pulses from the bit counter 36 are finally applied to the 1 input of a first type trigger circuit 39, each of these pulses placing the trigger circuit in its 1 state during which it applies to an output of the storage circuit, connected to the control circuit, an "extraction call signal" AS.

Finally, the 0 input of the trigger circuit 39 is connected to an input of the circuit 14 supplied with a signal $Z_b$ from an output of the control circuit 16.

Let $h_x$ be the instant corresponding to the $x^{th}$ pulse $I_s$; the counter 36 supplies output pulses the leading edges of which appear at the instants $h_{zn}$, where $z$ is an integer, and change the count of the counter 38 at the same time that they bring about the transfer, to the register 35, of a character, coming from an asynchronous channel, recorded in the buffer register 34.

The bits of this character are transmitted to the synchronous channel between the instants $h_{zn}$ and $h_{(z+1)n}$. (The last bits being replaced by zeroes if the number of bits $N_k$ of the character is less than $n$).

During this transmission operation, with the exception of the transmission of the last bit, the counter 38 is in a state $V = k$. The output signal V from the counter 38, by definition, determines the transmission period associated with the different asynchronous channels.

Therefore, any character written, under the control of the signal S, into the buffer register 34 during the time interval delimited by $h_{(z-1)n}$ and $h_{zn}$, should come from the asynchronous channel $k$ if the character counter 38, during the writing in of this character into the register 34, is in the state $k'$ preceding its state $k$ ($k' = 0$ for $k = 1$, $k' = 1$ for $k = 2$, $k' = 2$ for $k = 3$).

The signal S is so generated that this condition is satisfied.

On the other hand, at the same time that the contents of the register 34 are cleared into the register 35, the trigger circuit 39 is placed in the 1 state in which it supplies the extraction call signal AS utilised in the control circuit 16 (FIG. 2).

The trigger circuit 39 is reset to 0 by the signal $Z_b$. The frame start signal is injected into the line 4 by conventional means, not shown in the drawing, controlled by the zero state of the character counter 38.

Figure 7:
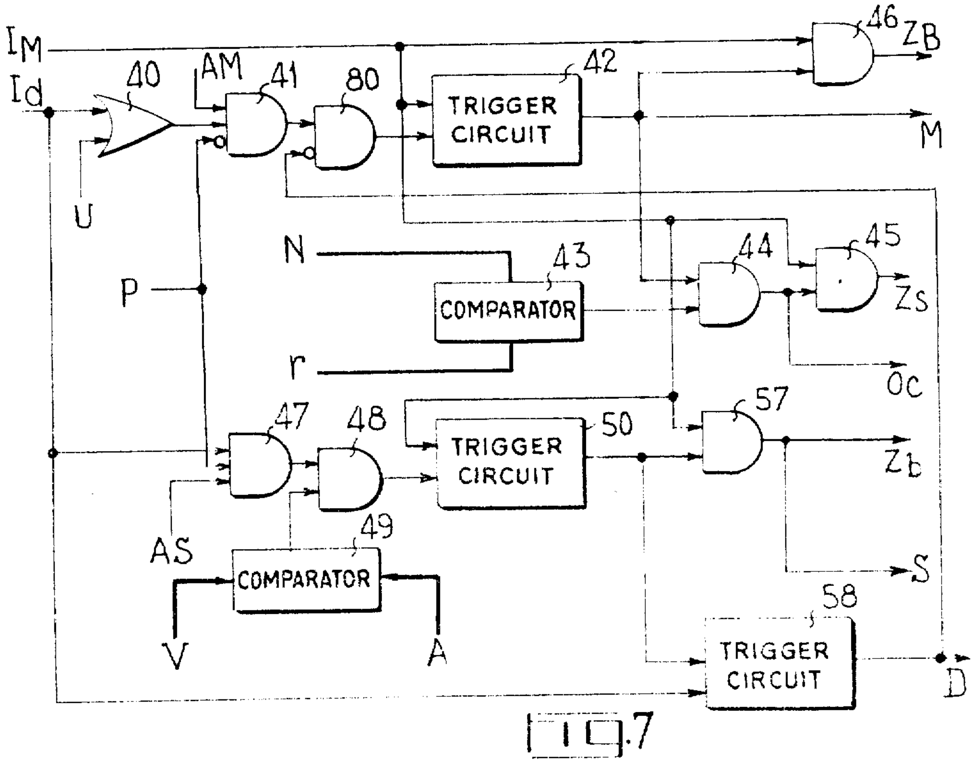

FIG. 7 is a detailed diagram of the control circuit 16 which will be described at the same time that an explanation is given of the general mode of operation of the multiplexer. In this drawing, the aforementioned inputs are to be seen:

AM (write-in call signal)
N (signal indicating numbers of bits per character)
$I_M$ (circulating memory clock pulses)
V (time channel identification)
$I_d$ (last section pulses)
AS (extraction call signal)
U (signal from the last stage of occupation register)
P (signal from the penultimate stage of occupation register) and
$r$ (position number signal).

For the production of the signals M and $Z_B$, the control circuit comprises on OR-gate 40 supplied at its two inputs respectively with the pulses $I_d$ and the signal U. The output of this gate is connected to the first input of an AND-gate 41 whose second input receives the write-in call signal AM and its third, which inverts the input bit, with the signal P.

The output of the gate 41 is connected, through an AND-gate 80, to the signal input of a second type trigger circuit 42 whose control input receives the pulses $I_M$. The AND-gate 80 is supplied on the other hand, at an input which performs inversion of the signal, with the section contents transfer signal D, the latter being obtained as will be indicated later on.

The output of the trigger circuit 42 is connected to the first input of an AND-gate 46 supplied on the other hand with the pulses $I_M$.

To produce the signals OC and $Z_s$, a comparator 43 receives at a first multiple input the signal N (number of bits per character) and at a second multiple input the position number signal $r$, the comparator delivering a signal if the two numbers N and $r$ are the same.

The output of the comparator 43 is connected to the second input of an AND-gate 44 supplied at its first input with the output signal from the trigger circuit 42.

Finally, the output of the gate 44 is connected to the first input of an AND-gate 45 whose second input receives the pulses $I_M$.

$H_x$ designating the instant marked by the $x^{th}$ pulse $I_M$ and $\theta_x$ the time interval between the instants $H_x$ and $H_{x+1}$, it will be seen, referring to the time diagram of FIG. 3, that a given input storing circuit can produce a write-in call signal AM during a time interval $\theta_{x-2}$, only if the last stage of the register is being occupied by the last section of the group of sections preceding that which is assigned to this input circuit, or by one of the first (C−1) = 3 sections of this latter group. The section $C_i$, then occupying the penultimate stages of the registers, is one of the four belonging to this last group and access to it will be gained at the instant $H_x$.

This being so, it will be seen that if in effect an input circuit delivers a write-in call signal during a time interval $\theta_{(x+2)}$, the gate 41 will immediately supply a signal if the memory section $C_i$ is the one which should receive a bit B to be recorded: The data compartment of this memory section is not completely filled (condition $\overline{P}$) and, is either the first of the appropriate group (condition $I_d$) or the section preceding this section is occupied (condition U).

If the gate 41 supplies a signal from some instant onwards in the time interval $\theta_{x-2}$, and if furthermore the signal D is not present, then the trigger circuit 42 changes to the 1 state at the instant $H_{x-1}$, when a clock pulse $I_M$ enables the output signal from the gate 41 to be recorded in this trigger circuit. If the trigger stage 42 is in its 1 state, it supplies the write-in signal M which, at the instant $H_x$, will bring about the writing of bit B in the appropriate cell of the circulating memory, at the same time that the corresponding position number registers receive signals increasing the position number by one unit, as explained at the time of the description of the memory circuit 10.

If the writing in of the bit B is to complete a character, the AND-gate 44 supplies the signal OC at the same time that the trigger circuit 42 supplies the signal M, and the occupation bit is recorded at the instant $H_x$ in the manner already explained at the time of the description of the memory circuit 10.

On the appearance of the pulse $I_M$ which results in the storage of a data bit at the instant $H_x$, the gate 46 supplies the signal $Z_B$ which, in the input circuit from which the recorded data bit emanates, acts to reset to zero the trigger circuit 21 and if need be the trigger circuit 22 (FIG. 4), if the considered input circuit is the circuit 11, or the corresponding trigger circuits of another input circuit. This will result in the disappearance of the write in call signal AM coming from the input circuit in question, and consequently in the disappearance of the corresponding signal M, due to the resetting to zero of the trigger circuit 42.

On the other hand, if the bit B which was recorded, was the last one of a character, then the gate 45, at the instant $H_x$, will supply the signal $Z_S$ which resets the start detector of the involved input circuit to the resting condition and zeroes the counter responsible for counting the pulses $I_1$ (or $I_2$ or $I_3$) of this input circuit.

If write-in in the memory section accessible at the instant $H_x$ has not been possible, it will take place either in another memory section of the same group during the same period of access to this group, or during its next period of access, the circulating memory performing at least two revolutions for any period $T_k$.

As far as the extraction of a character from the memory is concerned, the frequency $F_M$ is chosen so that the memory performs at least two revolutions between two extraction call signal As. It has been seen, on the other hand, that an extraction call signal AS initiated by the output circuit 14 while its character counter 38 (FIG. 6) is in a given state $k'$, was concerned with the extraction of a character coming from the channel $k$ corresponding to its next state. For this extraction to take place at the instant $H_y$, it is necessary on the other hand that during the time interval $\theta_{y-2}$, the address counter should be in the state $k_p$ which precedes its state k.

In order for the condition $k' = k_p$ at all times to be translated by equality of the binary numbers V and A (taking into account the fact that the counter 38 supplying the signal V has a state 0 which has no counterpart in the states of the counter 8, delivering the signal A), it is merely necessary to translate the states of the two counters into terms of the corresponding binary numbers, with the exception of the state 3 of the counter 8, which will be translated by the binary number 00.

The control circuit comprises a gate 47 with three inputs which receive the signal P, the signal AS and the pulses $I_d$. The output of the gate 47 is connected to the first input of a gate 48 whose second input is connected to the output of a comparator 49 receiving, at its two multiple inputs, the signals V and A respectively.

If the gate 48 delivers a signal during at least the end of the time interval $\theta_{y-2}$, all the conditions will be satisfied for the transfer of a character at the instant $H_y$ to the buffer register 34 (FIG. 6). The gate 48 is connected to the signal input of a second type trigger circuit 50 whose control input receives the pulses $I_M$, this trigger circuit 50, at the instant $H_{y-1}$, changing to the 1 state in which it supplies the first input of a gate 57 receiving at its second input the pulses $I_M$, this later gate, at the instant $H_y$, producing on the one hand the signal S and on the other the signal $Z_b$, the former initiating in the output storage circuit 14 (FIG. 6) transfer of the character in question to the buffer register 34 and the latter (which is identical to the former and distinguished from it only in a functional way) causing the disappearance of the extraction call signal AS, and thereby, the triggering of the trigger circuit 50 (FIG. 7) into the 0 state.

Finally, to produce the contents transfer signal D, the control circuit comprises a first type trigger circuit 58 whose 1 input is supplied with the output signal from the trigger circuit 50 and its 0 input with the pulses $I_d$. This trigger circuit 58 thus supplies the section contents transfer signal D for the time required for the execution of the transfer function within a group, this transfer being carried out through the bits of the penultimate stages of the registers, being transferred to their first stages for three successive pulses $I_M$, and zeroing of the contents of these last stages prior to the next clock pulse.

A demultiplexer in accordance with the invention will now be described. The circulating memory is identical to that used in the multiplexer with identical groups corresponding to the asynchronous channels. The transfer of a whole character from a time channel of the synchronous channel, is carried out into the data compartment of the first free memory section in the group assigned to the corresponding asynchronous channel, when said memory section occupies the first stages of the registers, and extraction bit by bit of the bits is carried out from the group first sections when these latter occupy the last stages of the registers, the complete extraction of a character producing a contents transfer within the corresponding group.

The position number signal now designates the position number of the next bit to be extracted from the corresponding memory section. However, the designation $r$ will be retained for this signal since this will still be the output signal from the position number registers.

The occupation signal is this time 1 as soon as the corresponding data compartment is occupied, and does not revert to 0 until the whole character has left the memory. The notations P and U will be retained since these signals still come from the penultimate and last stages of the occupation register.

A demultiplexer of this kind can be considered not merely as being located at a station where it demultiplexes a synchronous signal such as described at the time of discussion of the multiplexer, but also in joint use with the aforedescribed multiplexer in a duplex link, the demultiplexer receiving the signal from a synchronous channel 104 and distributing them to the three asynchronous channels 101, 102 and 103. As far as the following description is concerned, the second of these cases will be considered because it makes it possible to demonstrate how common elements can be employed for both multiplexing and demultiplexing.

Figure 8:
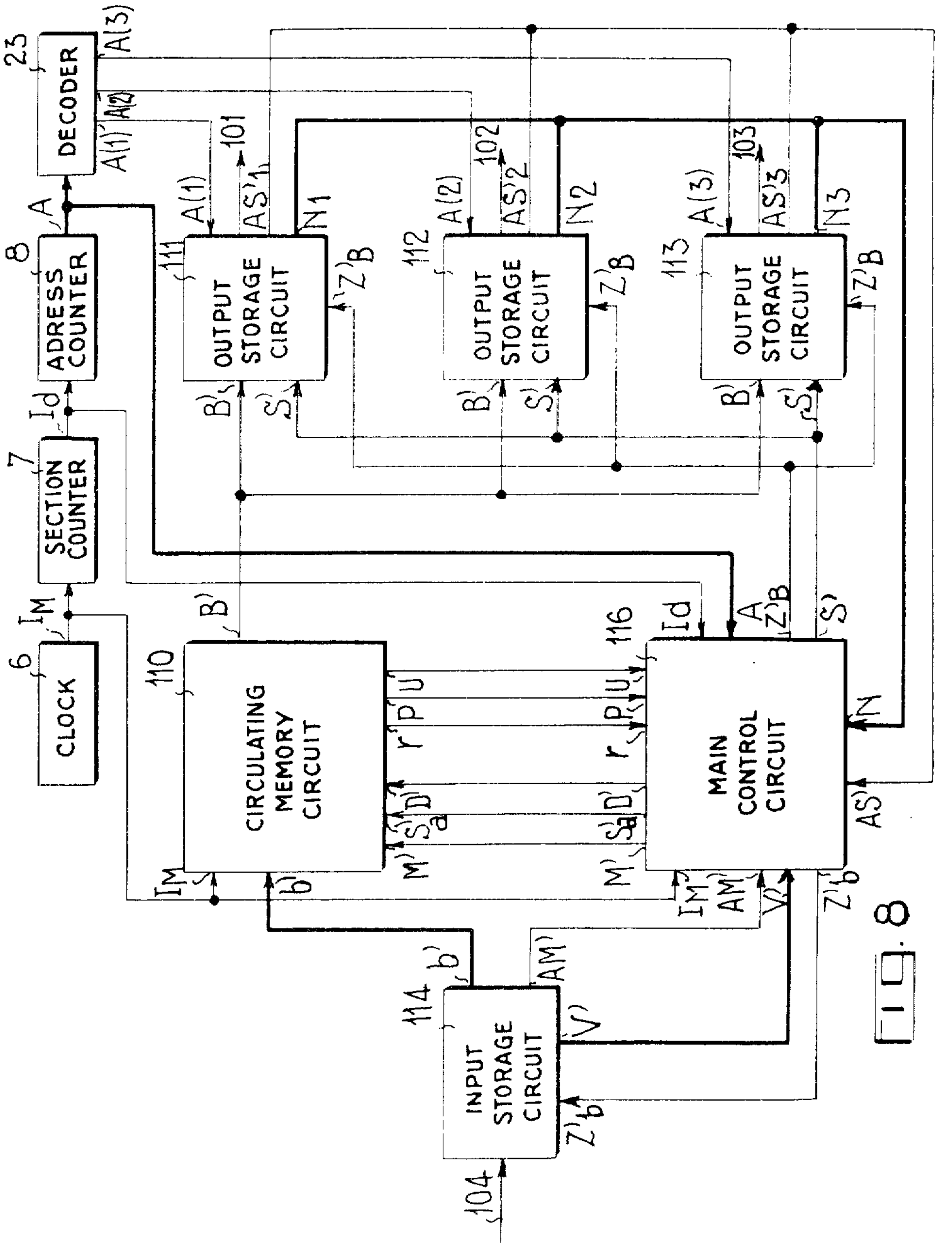
FIG. 8 is a block diagram of a bit transfer system in accordance with the invention, for demultiplexing purposes.

FIG. 8 is a general block diagram of the device.

It comprises an input storage circuit 114 receiving the signals from the synchronous channel 104, memory circuits 110, three output storage circuits 111, 112 and 113 supplying the lines 101, 102 and 103, and again, the clock 6, producing the frequency $F_M$, the section counter 7, the address counter 8 and the decoder 23, those four elements being interconnected as in the case of FIG. 2.

The same symbols as before are utilised in application to the same parameters and signals.

The pulses $I_M$ from the clock 6 are applied to the circuits 110 and 116, the signal A from the address counter 8 and the last section pulses $I_d$ are applied to the control circuit 116 while the signals A(1), A(2) and A(3) from the decoder 23 are applied respectively to the output circuits 111, 112 and 113.

The other connections will be specified hereinafter, during the description of the circuits which will be briefer than has been the case for the multiplexer because of the similarities in operation.

Figure 9:
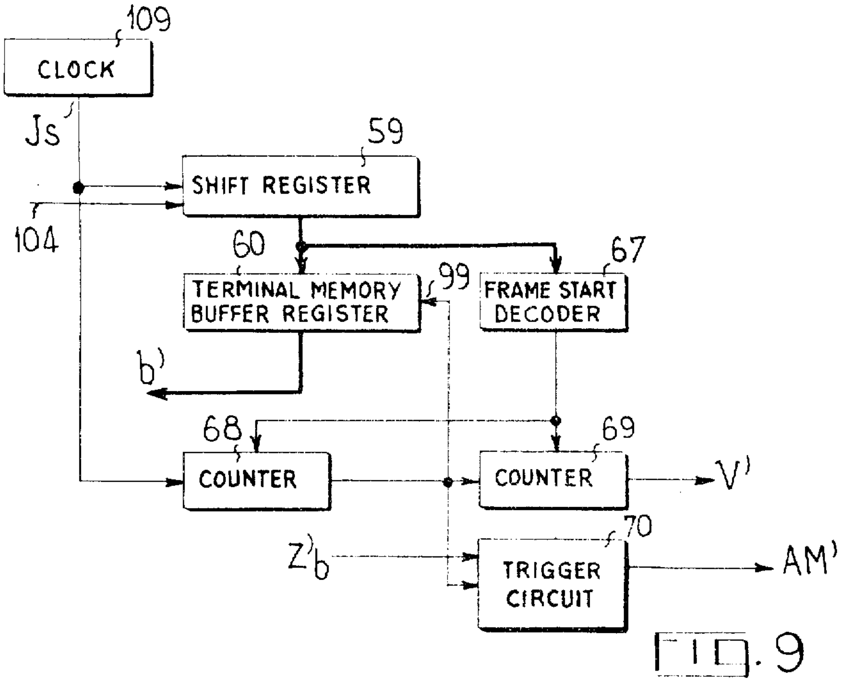
FIGS. 9 to 12 are detailed diagrams of parts of the system of FIG. 8.

FIG. 9 is a diagram of the input storage circuit 114.

The line 104 supplies a shift register 59 with $n$ stages, receiving the shift pulses $J_s$ from a clock 109 at frequency $F_s$, this clock being synchronised by conventional means with the reception of the bits. The $n$ stages of the register 59 are provided with external outputs represented by a single wire in the drawing and respectively connected to the input of the $n$ stages of a buffer register 60 and to the $n$ inputs of a decoder 67 decoding the frame start signal. The eight outputs $b'_1$ to $b'_8$ of the buffer register 69 are grouped in the drawing in a multiple connection $b'$ connected to the memory circu[illegible] 110 of FIG. 8. The pulses $J_s$, which play the part of sampling pulses for the digits of the line 104, are also applied to a modulo $n$ counter, 68, operating as a divider by a factor of $n$ and placed in the zero state by the output signal from the decoder 67. When the counter 68 has received $n$ input pulses, its supplies to a control input 99 of the buffer register 60 a pulse which causes the transfer of the contents of the register 59 to the buffer register 60. The output pulses from the counter 68 are on the other hand applied to a character counter 69 which is a modulo K + 1 = 4 counter, whose dual output supplies the signal V' which, by its states 1 to 3, identifies the different time channels, this counter being reset to the 1 state by the output signal from the decoder 67, the decoding of the frame start signal normally being carried out at V'= 0.

The reaching of the count V'= $k$ by the counter 69, corresponds to the reception of the time channel defined by the number (100+$k$).

The output of the counter 68 is finally connected to the input 1 of a first type trigger circuit 70.

When all the bits (including the filler zeroes if $N_K < n$) of a time channel have been recorded in the register 59, the output pulse from the counter 68, at the same time as initiating the transfer of the bits from the register 59 to the buffer register 60 and the change in state of the counter 69, places the trigger circuit 70 in the 1 state so that this trigger circuit then produces the write-in call signal AM'. During the simultaneous writing into the memory of the $n$ bits recorded in the buffer register, the trigger circuit 70 will be reset by a pulse $Z'_b$ coming from the control circuit 110.

Figure 10:
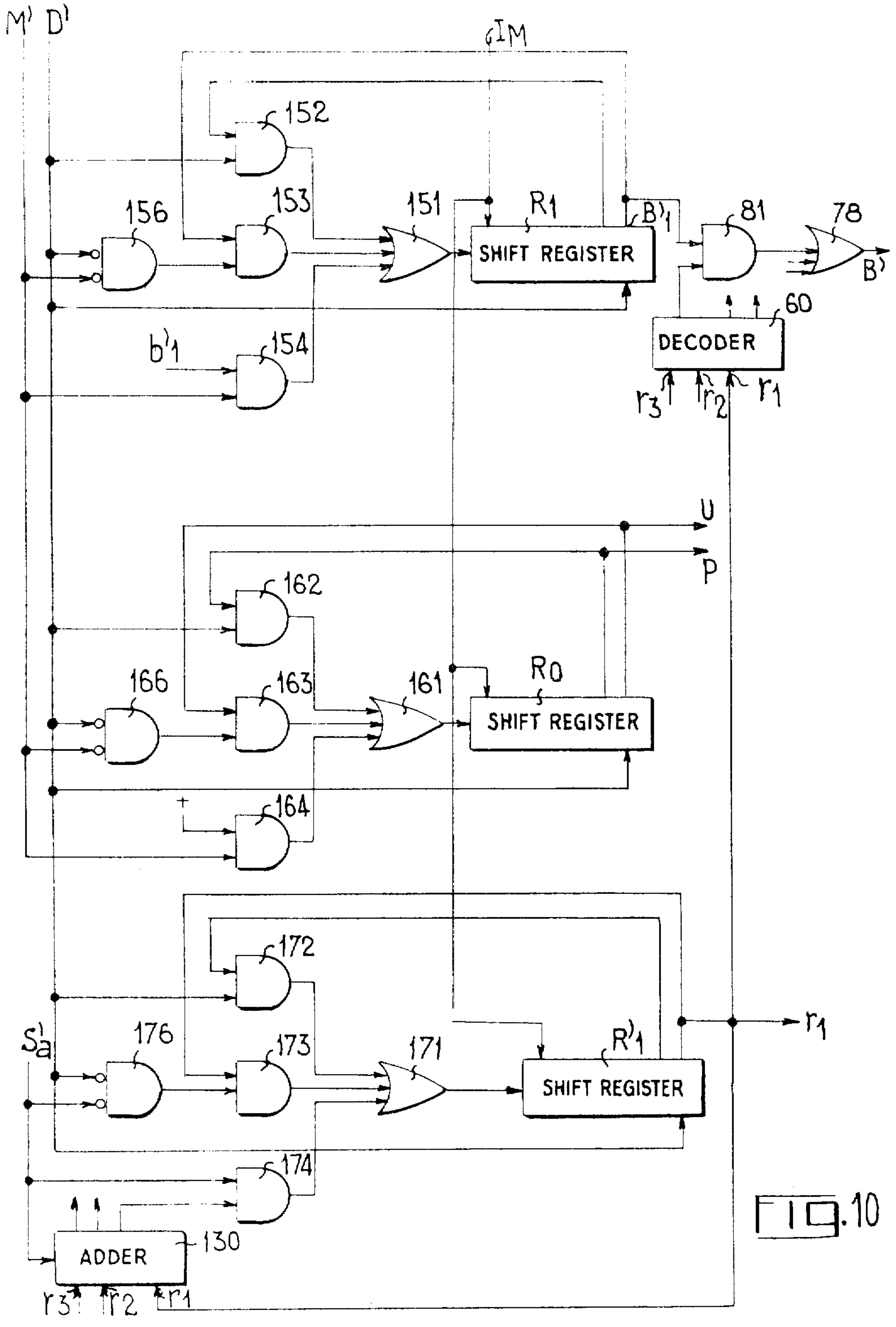

In FIG. 10, which illustrates the memory circuit 110, the circulating memory is identical to that of the multiplexer and the same symbols have been used to designate the registers. The input OR-gates of the registers and the AND-gates used for the section contents transfer, writing-in and normal loop operations, are shown again with reference numbers which have been increased by 100 in relation to those employed in FIG. 4. Only, the differences in the way in which these gates are supplied in comparison to the corresponding gates used in the memory circuit of the multiplexer will be set forth.

The registers, as far as the contents transfer operation is concerned, operate in the same way as during multiplexing, the signal D' delivered by the control circuit 110 taking the place of the signal D.

For writing-in, the first inputs of the write-in gates of the data regiters (154 for the register $R_1$), receive instead of the signal B the respective output signals $B'_1$, $b'_2$, . . . $b'_8$ from the buffer register of the input storage circuit, while their second inputs all receive from the control circuit a write-in signal M'.

The second input of the write-in gate 164 of the occupation register, is supplied not with the signal OC but with said same signal M'.

Write-in in the position number registers is carried out in the same way as in the multiplexer with the difference that a signal $S'_a$ delivered by the control circuit 116 is substituted for the signal M, both at the signal input of the adder 130 (corresponding to the adder 30) and at the second inputs of the write-in gates such as gate 174.

The second inputs of the loop gates are supplied, in respect of all the registers, with the output signal from a NOR-gate (156 for $R_1$, 166 for $R_0$, 176 for $R'_1$) the latter being suppled respectively at its two inputs with the singals M' and D' as concerns the data registers and the occupation registers, and the signals $S'_a$ and D' as concerns the position number registers.

The memory circuit has the same auxiliary output signal P, U and r, as in the multiplexer.

As far as the data registers are concerned, the outputs of the last stages of these registers, supplying the bits B'($q$ = 1, 2, . . . 8), respectively supply the first inputs of eight AND-gates (81 for the register $R_1$) whose second inputs are respectively connected to the eight outputs of a decoder 60 receiving the composite position number signal *r*.

The outputs of these eight AND-gates are connected to the eight inputs of an OR-gate 78 whose output supplies a signal B', made up of a series of signals $B'_{rk}$, where *r* is the position number of the bit in the character in which it belongs and $(k + 100)$ the number designating the asynchronous channel to which said character is assigned.

Figure 11:
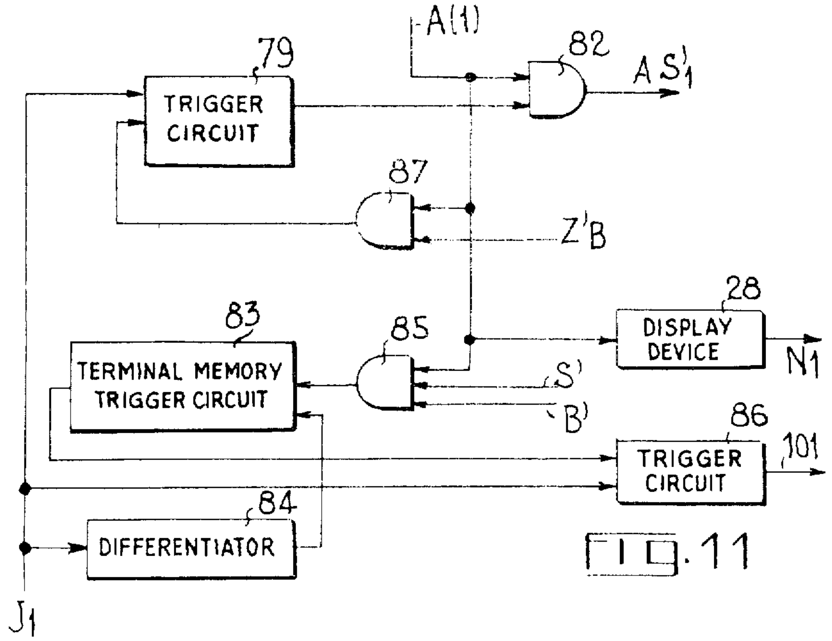

FIG. 11 illustrates the diagram of the output storage circuit 111.

There, the input A(1), connected to the first output of the decoder 23 supplied by the address counter 8 (FIG. 8), can be seen. The signal A(1), as far as the output circuit 111 is concerned, consititutes an enabling signal identical to that which is utilised in the input circuit 11 of the multiplexer (FIG. 2).

This output storage circuit, finally, comprises an input supplied with the pulses $J_1$ at frequency $F_1 = 1/T_1$, these pulses $J_1$ being obtainable by complementary frequency division in the divider circuit 15 of the multiplexer (FIG. 2).

The input $J_1$ is connected to the 1 input of a first type trigger circuit 79 whose output is taken to the first input of an AND-gate 82 having a second input supplied with the enabling signal A(1).

An AND-gate 85, with three inputs, receives from the control circuit the extraction signal S', the signal B' from the data registers and the enabling signal. Its output is connected to the 1 input of a first type trigger circuit 83 whose 0 input receives, from a differentiating circuit 84, control pulses coinciding with the trailing edges of the pulses $J_1$ applied to the differentiating circuit.

The output of the trigger stage 83 is taken to the signal input of a second type trigger circuit 86 whose control input receives the pulses $J_1$ and whose output supplies the line 101.

Finally, an AND-gate 87 receives the enabling signal A(1) from the decoder 23 and a signal $Z'_B$ generated by the control circuits 116 (FIG. 2).

The output storage circuit 111, finally, comprises the device 28 for displaying the number of bits per character, common with that of the input circuit 11 of the mutiplexer, this device supplying the signal $N_1$, common with that produced in the input circuit 11, it having been assumed that the circulating memories of multiplexer and demultiplexer operate synchronously with each another.

Each pulse $J_1$ places the trigger circuit 79 in the 1 state. The presence of a signal $AS'_1$, the extraction call signal, at the output of the gate 82 is subordinate to the trigger circuit 79 being in the 1 state and the presence of the enabling signal A(1).

If the gate 85 simultaneously receives the enabling signal A(1) and the extraction signal S' coming from the control circuit 116, the bit $B'_{q1}$ $(q = 1, 2 \ldots)$ constituting the signal B' at this instant, is recorded in the trigger circuit 83 and upon the appearacne of the next pulse $J_1$ to follow this recording, the trigger circuit 86, for a time $T_1$, adopts the 0 or 1 state corresponding to the value of $B'_{q1}$, and this is transmitted to the channel 101. On the other hand, the trigger circuit 83 is reset to zero at a time coinciding with the trailing edge of this same pulse $J_1$. Upon the recording of the bit in the trigger circuit 83, the trigger stage 79 has been reset to the 0 state by means of the signal $Z'_B$. The process starts all over again with a new pulse $J_1$.

The output storage circuits cannot operate simultaneously so that the outputs $AS'_1$, $AS'_2$, $AS'_3$ of those three output storage circuits supply a single connection which delivers the corresponding sum signal and terminates at an input AS' of the corresponding sum signal and terminates at an input AS' of the control circuit 116 (FIG. 8).

Similarly, the three outputs $N_1$, $N_2$, $N_3$ are taken to a multiple connection terminating at the input N of the circuit 116.

The inputs $Z'_b$ of each of the output circuits are supplied from one and the same output of the control circuit. The same applies to the inputs S'.

Figure 12:
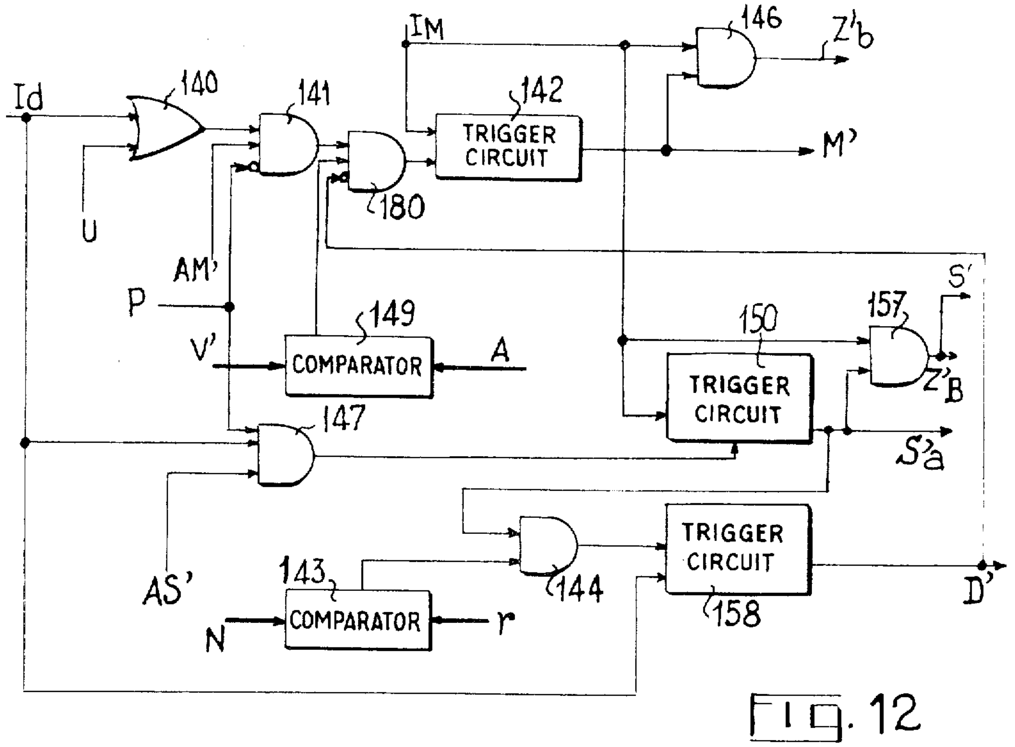

FIG. 12 illustrates the diagram of the control circuit 116. There, the following inputs are shown again:

$I_d$ (last section pulses)

U and P (signals from the last and penultimate stages of the occupation register)

A (address signal)

r (position number signal)

AM' (write-in call signal)

AS' (extraction call signal)

N (number of bits per character)

V' (time channel identification signal)

$I_M$ (circulating memory clock pulses).

Here, for the production of the signal M' and the signal $Z'_B$, a circuit is used, which is nearly identical to that employed for the production of the signals M and $Z_B$ in the multiplexer (FIG. 7), is used, the differences being that the write-in call signal AM' is substituted for the signal AM and the signal D' for the signal D and that the gate 180 corresponding to the gate 80 of the multiplexer, has three inputs, the third of which receives the output signal from a comparator 149 supplied with the signals V' and A, this supplementary condition indicating the correspondence between the time channel from which the character for storage in the memory stems, and the section group which will be accessible for this storage function. The elements 140, 141, 180, 142, 146 of this circuit correspond to the elements 40, 41, 80, 42, 46 of the multiplexer.

The signals S', $S'_a$ and $Z'_B$ are likewise obtained using a circuit differing from that which supplies the signals S and $Z_b$ in the multiplexer, solely in that the input signal S' is substituted for the signal S and the input signal V' for the signal V, and in that there are no elements corresponding to the elements 48 and 49 (the references of the elements in this circuit 147, 150 and 157, having been increased by 100 in relation to the corresponding elements in the multiplexer). The trigger circuit 150 supplies the signal $S'_a$ and the gate 157 the signals S' and $Z'_B$ which are identical like the signals S and $Z_B$.

The section contents transfer signal D' only appears when a character has been completely extracted from a data compartment.

The circuit for producing the signal D' comprises a comparator 143 corresponding to that 43 used in the multiplexer, and receiving the signals N and r, an AND-gate 144 receiving the equality signal from this comparator and the signal $S'_a$, and a first type trigger circuit 158, the 1 input of which is cononected to the output of the gate 144 while its 0 input receives the pulses $I_d$.

In comparing the detailed circuits, it has been found that it is possible to use elements which are common to both multiplexing and demultiplexing functions by employing two identical circulating memories operating synchronously with one another.

It is possible to increase the number of common elements by replacing the two identical circulating memories each with K groups of C memory sections, by a single circulating memory with 2 K sections, K of which are assigned to the multiplexing function and K to the demultiplexing function, and by doubling the frequency of the pulses $I_M$.

This, because, in the device described, the operations carried out in respect of one section group, whether this be for multiplexing or for demultiplexing, never interfere with those for other section groups.

It is sufficient, therefore, to utilise a modulo 2 K address counter, so that for a given asynchronous channel at the multiplexer (or demultiplexer), everything takes place as if there were (2K−1) others instead of (K−1) others.

In FIG. 13, a circulating memory of this kind has been illustrated in which the multiplexing section groups, with reference numbers 301 X, 302 X, 303 X and the demultiplexing sections, 301 Y, 302 Y and 303 Y, alternate with one another. The numbers 231, 232 and 233 indicate the data memory, occupation memory and position number memory. This memory does not differ structurally from the preceding one, except in terms of the length of the registers.

It is sufficient then to assign to the output storage circuits of the demultiplexer, the enabling signals A(1), A(3) and A(5) from the address counter decoder, and to the input matching circuits of the multiplexer the signals A(2), A(4) and A(6) from this decoder, the display device 28 of the input and output storing circuits associated with the corresponding asynchronous lines, being controlled by two enabling signals.

It is sufficient to compare the memory circuits of FIGS. 5 and 10 and the control circuits of FIGS. 7 and 12 to see all those elements which can be common to both multiplexer and demultiplexer, at the expense of supplementary gates smaller in number than the number of elements which have been spared on.

The write-in, contents transfer, and loop gates of the registers can be common.

The circuit 143 - 144 of FIG. 12 can be merged with the circuit 43–44 of FIG. 7, provided that the first input of the gate 44 is supplied through an OR-gate receiving the two signals, etc. all these economies of equipment being within the scope those skilled in the art.

It is also possible to retain a modulo K address counter and a K-output decoder, by replacing the circuit 6–7–8–23–of FIG. 3 with a circuit which (FIG. 14) comprises the clock 6 supplying the modulo C = 4 section counter 7, the latter in turn supplying a divider 90 performing division by a factor of 2 and constituted by a bistable multivibrator, the address counter 8 being supplied in a manner described hereinafter and this counter being followed by the decoder 23.

In FIG. 15, at (a) the pulses $I_M$ have been shown, at (b) the output pulses $I_d$ from the memory section counter 7, and at (c) and (d) the signals X and Y appearing at the two complementary outputs of the bistable multivibrator 90.

The signals X and Y respectively supply the first inputs of two AND-gates, 91 and 92 whose second inputs receive the output pulses from the memory section counter 7.

At (e) and (f) the output pulses $I_X$ and $I_Y$ from the AND-gates 91 and 92 have been shown.

The pulses $I_Y$ are applied to the input of the address counter 8 whose changes in state are indicated at (g) in FIG. 15.

$X_1$, $X_2$, $X_3$ have been used to designate the positive square waves of the signal X, respectively appearing during the states 1, 2 and 3 of the address counter. The positive square waves of the signal Y have been designated in a similar manner, by $Y_1$, $Y_2$ and $Y_3$.

It will be seen then, that by means of the address counter signal, which will be referred to as A' here on the one hand and of the signals X and Y on the other hand, it is possible in respect of the input or of output storage circuits coupled to asynchronous channels, to define "enabling" periods equivalent to those which would be given by the signals A(1) to A(6) of a modulo 6 counter, and that in the circuits described the condition A(1) is replaced by A'(1)X or A'(1)Y.

On the other hand, the last section position pulses $I_d$ will have to be substituted by the pulses $I_Y$ where it is a multiplexing operation which is involved, and by the pulses $I_X$ where it is a demultiplexing operation which is involved.

The modifications to be made to the control circuits and to the input switching circuits of the registers, are, in view of the foregoing, within the scope of the person skilled in the art.

It should be pointed out in this context that the associated circuits of the circulating memory in fact constitute extensions of the control circuit and have only been shown separately therefrom in the drawings, in order to facilitate explanation. The same applies to those elements of the input and output storage circuits which are controlled by the address signals.

It should be pointed out, too, that the devices in accordance with the invention make it possible to assign to the asynchronous channels a synchronous channel whose bit transmission capacity only slightly exceeds the bit transmission speed during the periods of operation of the asynchronous channels, when the messages transmitted by these latter channels are separated by quite large quiescent periods.

Sel-evidently, the invention is open to other variations. In particular, if the various asynchronous channels have substantially different transmission speeds then in the synchronous channel time channels can be provided which are capable, in the course of each frame, of transmitting different numbers of characters for the different asynchronous channels.

For example, as far as multiplexing is concerned, the counter 38 of the output storage circuit 14 will then become a modulo $\Sigma c_k+1$ counter, where $c_k$ is the number of characters successively transmitted through that time channel of the synchronous channel which is assigned to the asynchronous line k. A decoding and recoding device will then transform the signal V from the counter 38 into a signal W with ($k$+1) values, presenting the 1 state when the counter 38 occupies one of the states 1, 2 . . . $c_1$, the 2 state when the counter 38 occupies one of the states $c_1+1$, $c_1+2$ . . . $c_1+c_2$, and so on, the state 0 on the part of the signal W corresponding to the 0 state on the part of the signal V. The signal W is then substituted for the signal V for comparison purposes.

A corresponding step would of course also be re- ;uired for the demultiplexing case.

It has been assumed in what precedes that the num- er of asynchronous channels effectively coupled to he system was equal to the number (K for multiplexing r demultiplexing, 2 K for multiplexing- emultiplexing) of the circulating memory section roups. This, of course, is not a necessary condition, nd, for example, the described multiplexer may oper- te with a number of asynchronous channels less than ., provided the length of a frame of the synchronous hannels is in accordance with the number of section roups.

The invention is particularly applicable to the case /here the asynchronous channels are low-speed chan- iels.

Of course, the invention is not limited to the embodi- nents described and shown which were given solely by /ay of example.

What is claimed is:

1. A bit transfer system for transferring data bits from ach one of a number of asynchronous channels to a ynchronous channel, the number of the asynchronous hannels not exceeding a predetermined integer K ;reater than 1, and the number of data bits per data haracter not exceeding a predetermined integer $n$ ;reater than 1 for any one of the asynchronous chan- iels, said system comprising:

K first circuits respectively including K first terminal memories each having a one-bit capacity, each of said K first circuits comprising means for coupling to an asynchronous channel, means for successively transferring the bits from said asynchronous channel to its terminal memory, and signal generating means for generating a signal upon a bit entering its terminal memory;

a circulating intermediate memory comprising K.C sections respectively including K.C data compartments and K.C. auxiliary compartments, C being an integer greater than 1, each data compartment comprising n successive cells for storing a character, each auxiliary compartment comprising j auxiliary cells, j being an integer greater than 1, for storing bits indicating the amount of occupation of the data compartment belonging to the same section; each of said cells having a one-bit storage capacity; said circulating intermediate memory comprising an assembly of $(n+j)$ shift registers having successive stages and means for applying thereto the same clock pulses, said assembly of shift registers comprising n successive data shift registers for the circulation of said data compartments and $j$ auxiliary shift registers for the circulation of said auxiliary compartments;

an adress circuit fed by said clock pulses, for determining in said intermediate memory K groups of C successive sections respectively including K groups of C successive data compartments and assigning said K groups of data compartments and said K groups of sections to said K first terminal memories respectively through delivering address signals indicative of the position of said groups of sections in said shift registers;

a $(K+1)^{th}$ circuit having means for coupling to a synchronous channel, and including a $(K+1)^{th}$ terminal memory having an n-bit capacity for storing the characters successively extracted from said intermediate memory, transfer means for receiving each character successively stored in said $(K+1)^{th}$ terminal memory and successively transferring the bits thereof to said synchronous channel, signal generating means for generating signals indicating that said $(K+1)^{th}$ terminal memory is available for receiving a further character, and a timing circuit for determining the time channels respectively assigned to the characters originating from said K first terminal memories respectively, through delivering timing signals indicative of the time intervals respectively allowed for transferring characters from said K groups of data compartments respectively to said $(K+1)^{th}$ terminal memory;

auxiliary means coupled to the last two stages of said auxiliary shift registers for delivering auxiliary signals indicating whether the data compartment then occupying the penultimate stages of said data shift registers is or is not occupied by a complete character, and which is the first unoccupied cell of the data compartment then occupying the last stages of said data shift registers;

and control means, controlled by said address signals, said clock pulses, said auxiliary signals, said timing signals, the signals from said signal generating means of said K first circuits, and the signals from said signal generating means of said $(K+1)^{th}$ circuit, for:

-writing bit by bit the bits successively stored in said K first terminal memories respectively, in the groups of data compartments respectively assigned to said K first terminal memories, so that the first available data compartment of a group, in the direction of circulation of the intermediate memory, successively receives the bits of a complete character, each writing-in of a bit in a data compartment occurring upon this data compartment entering the first stages of said data shift registers, and simultaneously modifying the contents of the auxiliary compartment of the section to which this data compartment belongs;

- transferring the complete characters successively stored in the first data compartments of said groups to said $(K+1)^{th}$ terminal memory during said time intervals respectively allowed for said groups respectively, each transfer from the first data compartment of a group to said $(K+1)^{th}$ terminal memory occurring upon said data compartment leaving the last stages of said data shift registers, and transferring the contents of each one of the sections of this group other that the first one to the preceding section of this group, this being hereinafter referred to as "contents transfer operation."

2. A bit transfer system as claimed in claim 1, wherein said control means comprise $(n+j)$ write-in inputs for said $(n+j)$ shift registers respectively, and $(n+j)$ switching circuits, each of said $(n+J)$ switching circuits being coupled to the first stage of a respective one of said $(n+j)$ registers for coupling this first stage either to the penultimate stage of the same register, for a contents transfer operation, or to the write-in input for this register for writing in this first stage a bit delivered by this write-in input, or to the last stage of this register when neither of these two operations is to be performed.

3. A bit transfer system as claimed in claim 2, wherein said j auxiliary shift registers comprise $(j-1)$ position number shift registers, $(j-1)$ being as least equal to the number of bits required for expressing without ambiguity the decimal numbers from 1 to $n$ inclusive, and an occupation shift register and wherein each auxiliary data compartment comprises $(j-1)$ cells circulating in said $(j-1)$ position number registers, and a $j^{th}$ cell circulating in said occupation register; wherein each one of said K first circuits comprises a display device for displaying the number of bits per character in the asynchronous channel to which it may be coupled; and wherein said control means comprise an adder having a first input comprising $(j-1)$ terminals respectively coupled to the last stages of said $(j-1)$ position number registers, a second input coupled for receiving a signal representative of the binary value 1 upon a data bit entering said intermediate memory, and an output comprising $(j-1)$ terminals respectively forming the write-in inputs for said $(j-1)$ position number registers: said auxiliary means including a decoder having inputs respectively coupled to the last stages of the $(j-1)$ position number registers, and n outputs respectively coupled to said switching circuits for said n data shift registers, for allowing the $p^{th}$ bit ($p = 1, 2 \ldots n$) of a character to be written only in the first stage of the $p^{th}$ data shift register; said control means further comprising a comparator for comparing the number displayed by the display device of each of said K first circuits with the number stored in the $(j-1)$ first auxiliary cells of each one of the sections of the group assigned to the terminal memory of this first circuit and means having an output coupled to the write-in input for said occupation register, for delivering a signal upon the last bit of a character being written in the data compartment entering the first stages of said data shift registers.

4. A demultiplexer bit transfer system adapted for demultiplexing a synchronous channel multiplexed by means of a bit transfer system as claimed in claim 1, said demultiplexer bit transfer system comprising:

K output circuits respectively including K output terminal memories, each having a one-bit capacity, each one of said output circuits comprising transfer means for transferring to a respective asynchronous channel the bits successively stored in its terminal memory, and signal generating means for generating a signal indicating that a bit from its output terminal memory has been transferred to said transfer means;

an input circuit comprising means for coupling to said synchronous channel, an input terminal memory having an n-bit capacity, means for successively storing the characters from said synchronous channel in said input terminal memory, signal generating means for delivering a signal upon a complete character having been stored in said input terminal memory, and a timing circuit for delivering signals indicative both of the time channel of said synchronous channel from which a character originates and to which of said output terminal memories it must be transferred;

a circulating intermediate memory comprising K.C. sections respectively including K.C. data compartments and K.C. auxiliary compartments, C being an integer greater than 1, each data compartment comprising n successive cells for receiving a character, each auxiliary compartment comprising j auxiliary cells, j being an integer greater than 1, for storing bits indicating the amount of occupation of the data compartment belonging to the same section, each of said cells having a one-bit storage capacity; said circulating intermediate memory comprising an assembly of $(n+j)$ shift registers having successive stages, means for applying thereto the same clock pulses, said assembly of shift registers comprising n data shift registers for the circulation of said data compartment and $j$ auxiliary shift registers for the circulation of said auxiliary compartments:

an address circuit fed by said clock pulses for determining in said intermediate memory K groups of C successive sections respectively including K groups of C successive data compartments and assigning said K groups of data compartments and said K groups of sections to said K output terminal memories respectively, through delivering address signals indicative of the position of said groups of sections in said shift registers;

auxiliary means coupled to the he last two stages of said auxiliary shift registers for delivering auxiliary signals indicating whether the data compartment then occupying the penultimate stages of said data shift registers is or is not occupied by a complete character and which is the first occupied cell of the data compartment then occupying the last stages of said data shift registers; and control means, controlled by said clock pulses, said address signals, said timing signals, said auxiliary signals, and said signals from said signal generating means of said input circuit and of said K output circuits, for

- writing each of the characters successively stored in said input terminal memory, in the first, in the direction of circulation of said intermediate memory wholly unoccupied data compartment of tha group of data compartments assigned to the outpu terminal memory to which this character is to be delivered, each writing-in of a character in a data compartments occurring upon this data compartment entering the first stages of said data shift registers, and simultaneously modifying the content of the auxiliary data compartment of the section to which this data compartment belongs;
- transferring the successive bits of the character successively stored in the first data compartment of said groups to the output terminal memories respectively assigned to said groups, each transfer o a bit from the first data compartment of a group to the terminal memory assigned thereto occurrin upon the data compartment leaving the last stage of said data shift registers, and, when the transfe of a bit completes the transfer of a character, trans ferring the contents of each one of the sections c this group other than the first one to the precedin section of this group, and, when the transfer of a b from a data compartment does not complete th transfer of a character, modifying the contents c the auxiliary compartment belonging to the sam section as said last mentioned data compartmen

5. A bit transfer system as claimed in claim 4 wherein said control means comprise $(n-j)$ write-in in puts for said $(n+j)$ shift registers respectively, an $(n+j)$ switching circuits, each of said $(n+j)$ switchin circuits being coupled to the first stage of a respectiv one of said $(n+j)$ registers for coupling this first stag either to the penultimate stage of the same register, fc contents transfer operation, or to the write-in input ›r this register for writing in this first stage a bit deliv-·ed by this write-in input, or to the last stage of this :gister when neither of these two operations is to be ɜrformed.

6. A bit transfer system as claimed in claim 5, herein said $j$ auxiliary shift registers comprise $(j-1)$ osition number shift registers, $(j-1)$ being as least qual to the number of bits required for expressing ithout ambiguity the decimal numbers from 1 to $n$ in-usive, and an occupation shift register, and wherein ıch auxiliary data compartment comprises $(j-1)$ cells rculating in said $(j-1)$ position number registers, and $j^{th}$ cell circulating in said occupation register; wherein ıch one of said K output circuits comprises a display evice for displaying the number of bits per character ı the asynchronous channel to which it may be cou-led; and wherein said control means comprise an dder having a first input comprising $(j-1)$ terminals :spectively coupled to the last stages of said $(j-1)$ po-tion number registers, a second input coupled for re-eiving a signal representative of the binary value 1 ach time a bit is transferred from said intermediate ıemory to an output terminal memory and an output omprising $(j-1)$ terminals respectively forming the :ite-in inputs for said $(j-1)$ position number registers; ıid auxiliary means including a decoder having inputs :spectively coupled to the last stages of the $(j-1)$ posi-on number register, and n outputs coupled to said ontrol means for allowing a bit of a character to be :ansferred from a data compartment to an output ıemory only if the preceding bits of the same charac-ɜr have already been transferred; said control means ırther comprising a comparator for comparing the umber displayed by the display device of each of said : first circuits with the number stored in the $(j-1)$ first uxiliary cells of each one of the sections of the group ɔr delivering a signal upon the last bit of a character eing the only one left in the data compartment belong-ıg to the same section as said $(j-1)$ auxiliary cells, and ıeans for applying a signal to the write-in input for said ·ccupation register upon a character from said input ɜrminal memory entering the first stages of said data hift-registers.

7. A bit transfer system as claimed in claim 1, /herein each of said shift registers has 2 K.C. stages, nd further comprising demultiplexing means for trans-erring data bits from the time channels of a further ynchronous channel to further asynchronous channels espectively, the number of the further asynchronous hannels not exceeding K, and the number of data bits ›er data character not exceeding n for any one of the urther asynchronous channels, said demultiplexing means comprising:

K output circuits respectively including k output terminal memories, each having a one-bit capacity, each one of said output circuits comprising transfer means for transferring to a respective one of said further asynchronous channels the bits successively stored in its terminal memory, and signal generating means for generating a signal indicating that a bit from its output terminal memory has been transferred to its transfer means;

an input circuit comprising means for coupling to said further synchronous channel, an input terminal memory having an n-bit capacity, means for successively storing the characters from said further synchronous channel in said input terminal memory, signal generating means for delivering a signal upon a complete character having been stored in said input terminal memory, and a timing circuit for delivering further timing signals indicative both of the time channel of said further synchronous channel from which a character originates and to which of said output terminal memories it must be transferred;

a further circulating intermediate memory identical to said first mentioned intermediate memory; said further intermediate memory circulating in said assembly of shift registers;

Said address circuit delivering further address signals for determining in said intermediate memory K further groups of C successive sections respectively including K further groups of C successive data compartnent of compartments said K further groups of data compartments and said K further groups of sections to said K output terminal memories respectively;

said auxiliary means delivering further auxillary signals indicating which is the first occupied cell of the data compartment then occupying the last stages of said data shift registers, when said data compartment belongs to one of said further groups;

said control means being further controlled by said further address signals, said further timing signals, said further auxiliary signals, and said signals from said signal generating means of said input circuit and of said K output circuits, for

- writing each of the characters successively stored in said input terminal memory, in the first, in the direction of circulation of said intermediate memory, wholly unoccupied data compartment of that group of data compartments assigned to the output terminal memory to which this character is to be delivered, each writing-in of a character in a data compartment occurring upon this data compartment entering the first stages of said data shift registers, and simutaneously modifying the contents of the auxiliary data compartment of the section to which this data compartment belongs;
- transferring the successive bits of the characters successively stored in the first data compartments of said further groups to the output terminal memories respectively assigned to said further groups, each transfer of a bit from the first data compartment of a further group to the output terminal memory assigned thereto occurring upon this data compartment leaving the last stages of said data shift registers, and, when the transfer of a bit completes the transfer of a character, transferring the contents of each one of the sections of this further group other than the first one to the preceding section of this group, and, when the transfer of a bit from a data compartment does not complete the transfer of a character, modifying the contents of the auxiliary compartment belonging to the same section as said last mentioned data compartment.

* * * * *